2,948,714
Patented Aug. 9, 1960

2,948,714

NEW N-BENZYL PEPTIDES AND A PROCESS OF MAKING SAME

Gaston Amiard, Noisy-le-Sec, and Leon Velluz, Paris, France, assignors to UCLAF, Paris, France, a body corporate of France No Drawing. Filed Feb. 16, 1955, Ser. No. 488,702

Claims priority, application France Feb. 19, 1954

7 Claims. (Cl. 260—112)

The present invention relates to new peptides and more particularly to new N-benzyl peptides and to a process of making same.

Peptides are synthesized by condensation of the carboxyl group of an α-amino acid with the amino group of an identical or different α-amino acid according to the following reaction equation:

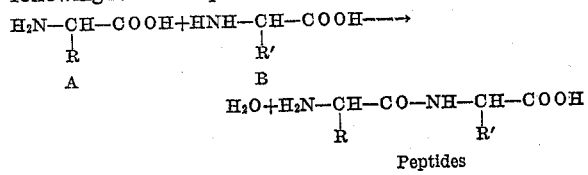

In these formulas R and R' represent the same or different radicals.

The amphoteric nature of amino acids, however, renders said reaction practically impossible when directly proceeding according to the equation given above. In order to effect condensation it is necessary, on the one hand, to set free the carboxyl group of amino acid A by partly or completely blocking its amino group and, on the other hand, to suppress the acid character of amino acid B by blocking its acid carboxyl group. To facilitate condensation, amino acid A, the amino group of which is protected, is usually employed in the form of its acid chloride or its acid azide while the acidity of amino acid B is neutralized by transformation into an ester group or into the acid amide or acid hydrazide group, which groups may also be substituted. It is understood, of course, that the amino group of amino acid A and the carboxyl group of amino acid B must be protected by groups the nature of which permits regeneration of said groups in the free state without causing simultaneous decomposition of the peptidic bond —CO—NH—.

The most commonly employed laboratory processes for blocking the amino group are the following:

(1) Benzyloxy carbonylation, i.e. addition of the radical $C_6H_5CH_2OCO$—, and its modification such as phenoxy thiocarbonylation, ethoxy carbonylation and the like: This procedure is rather inconvenient because the reacting agents must usually be prepared extemporaneously and require the use of phosgene which is difficult to handle due to its toxicity.

(2) Phthalylation, i.e. attachment of the phthalic acid radical to the amino group: This process involves the inconvenience that regeneration of the amino group requires the use of hydrazine or phenyl hydrazine which are rather expensive reagents.

(3) Amidification, i.e. attachment of a carboxylic acid radical or a sulfonic acid radical and conversion into an amide of such acids: For this purpose the amino acid is reacted with reactive derivatives of carboxylic acids or sulfonic acids, such as their acid chlorides or acid anhydrides, or with the acids themselves. This method is also of rather limited application since the amino group must subsequently be regenerated by saponification. Hydrogenolysis as used in the above mentioned reaction (1) or the use of a reagent which does not effect the peptidic bond as employed in the above mentioned reaction (2) cannot be used for such regeneration. Therefore, it depends upon the relative stability of the resulting peptide bond and the relative instability of the amide group whether the peptide group will be affected by saponification.

The following processes are most commonly used for blocking the corboxyl group:

(1) Esterification, i.e. formation of the methyl, ethyl, or benzyl ester: The benzyl ester is especially suitable since it permits regeneration of the carboxyl group of the resulting peptide by hydrogenolysis.

(2) Amidification, i.e. formation of amides, anilides and other readily saponifiable acid amides.

(3) Formation of hydrazides capable of subsequent cleavage by special methods.

None of the above mentioned methods of blocking the amino or the carboxyl groups is generally applicable. In some instances, none of them can be successfully used.

It is one object of the present invention to provide a new and simple process of producing peptides, which process does not have the disadvantages of the heretofore known processes and which can be applied to a great number of amino acids.

Another object of the present invention is to provide new and valuable peptide compounds, namely compounds wherein at least one of the free amino groups is substituted by one or two benzyl groups.

A further object of the present invention is to provide a process of producing new and valuable peptides.

Still another object of the present invention is to provide new and valuable N-benzyl and N,N-dibenzyl glycyl peptides.

Other objects of the present invention and advantageous features will become apparent as the description proceeds.

In principle, the process according to the present invention consists in condensing the hydrochloride of an acid chloride of N-benzyl or N,N-dibenzyl α-amino acids with the hydrochloride of a readily saponifiable ester of an amino acid. The hydrochloride of the resulting ester of the N-benzyl or of the N,N-dibenzyl peptide can readily be isolated and purified on account of its solubility in chloroform. By subsequent saponification by means of alkaline agents the N-benzyl, or the N,N-dibenzyl peptide is formed. By hydrogenolysis of said benzylated peptide, the free peptide is produced.

If the benzyl ester is employed as ester of the amino acid, simple hydrogenolysis permits to convert, in one operation, the benzyl ester of said N-benzyl or N,N-dibenzyl peptide into the free peptide.

The new process according to the present invention has the following advantages over the processes described in the literature:

(1) The hydrochlorides of the acid chlorides of N-benzyl or N,N-dibenzyl amino acids can readily be produced and, in general, are readily purified by recrystallization. In contrast hereto, the known benzyloxy carbonylation reaction requires the use of a special reagent and usually yields non-crystallizable oils.

(2) The use of an acid chloride of an N-benzylated or N,N-dibenzylated amino acid derivative yields, on subsequent reaction, peptides which are also benzylated at their nitrogen atom and which possess the following characteristic properties:

(a) The benzylated nitrogen atom retains, with respect to acids, a certain basicity which favors the formation of acid addition salts such as that of chlorohydrates. In contrast hereto, the nitrogen atoms which are protected by amidification no longer possess a basic character. This is, for instance, the case with acid amides such as the formylated, carbobenzoxylated, phthalylated derivatives.

(b) The ability of forming acid addition salts and especially of forming chlorohydrates has a very advantageous effect upon the solubility of the resulting peptide compounds. As will be seen from the examples given hereinafter, the solubility of different hydrochlorides of esters of N-benzyl or N,N-dibenzyl peptides prepared according to this invention in chloroform is quite remarkable. In general, the solubility of compounds of this series in organic solvents represents a considerable advantage since it greatly facilitates purification of said intermediate products.

(c) Likewise, since the benzylated amino group does not have the character of an acid amide group but has the character of an amino group, such an amino group can only be set free by hydrogenation. Whereas other reagents used for blocking the amino group are affected by alkalies or acids, the N-benzylated derivatives according to the present invention remain stable in the presence of such alkaline or acid reagents.

(d) As a result of the advantage indicated under (c) it is possible to maintain, in the course of the peptide synthesis, certain amino groups in the form of amide groups which can be hydrolized by acids and alkalies while other amino groups remain blocked during said hydrolysis reaction and are only set free by hydrogenolysis. Consequently, the process of this invention is capable of varied application.

(e) Finally, the fact that the N-benzyl or N,N-dibenzyl peptides are converted by hydrogenolysis into the corresponding peptides eliminates any danger of racemization in case the N-benzyl or the N,N-dibenzyl peptide is optically active.

The hydrochlorides of the acid chlorides of N-benzylated or N,N-dibenzylated amino acids have not been described heretofore nor has their use in the peptide synthesis been disclosed. They are most conveniently obtained by subjecting N-benzylated or N,N-dibenzylated amino acids to the action of phosphorus pentachloride in benzene. It is, of course, also possible to use, in place of phosphorus pentachloride, its mixture with acetylchloride, or phosphorus oxychloride, thionyl chloride, phosphorus trichloride, and other agents ordinarily employed in the production of acid chlorides.

The other reaction components, the hydrochlorides of amino acid esters, are produced according to classical methods described in the literature, for instance, by esterification in the presence of gaseous hydrochloric acid, thionyl chloride, or acetyl chloride.

Condensation of said two reaction components is carried out in a neutral water-miscible organic solvent, for instance, in dioxane in tetrahydrofuran, and in the presence of alkali hydroxide in order to set free the ester from its hydrochloride. The hydrochloric acid formed in said condensation reaction is neutralized at the rate of its formation by the addition of fresh quantities of alkali hydroxide or by using an excess of the amino acid ester reactant or by the addition of a tertiary organic base. The hydrochloride of the ester of the resulting N-benzyl or N,N-dibenzyl peptide is finally extracted from the reaction mixture by means of a solvent such as chloroform or other chlorinated solvents. After purifying said benzylated peptide ester, it is saponified by means of alkaline agents whereby the corresponding N-benzyl or N,N-dibenzyl peptide are obtained.

It is quite surprising, for instance, that in case the hydrochloride of the amino acid ester which is reacted with the hydrochloride of the N-benzyl or N,N-dibenzyl amino acid chloride is a hydrochloride of an ester of a hydroxy amino acid, the hydrochloride of the benzylated amino acid chloride preferably reacts with the amino group of said hydroxy amino acid ester and not with its hydroxyl group. Thereby, an ester of N-benzyl or N,N-dibenzyl-N'-peptide with a free and unreacted hydroxyl group is obtained. By saponification, the corresponding N-benzyl or the N,N-dibenzyl-N'-peptide with a free hydroxyl group are produced as explained hereinbefore.

The N-benzyl-α-amino acids serving as starting materials for the production of the hydrochlorides of N-benzylated amino acid chlorides can be prepared according to methods as they will be described hereinafter:

(1) OPTICALLY ACTIVE N-BENZYL-α-AMINO ACIDS

They are obtained (a) by reaction of benzaldehyde with the ester of the corresponding amino acid and reduction of the resulting Schiff's base, followed by saponification; (b) by reaction of benzaldehyde with the barium salt of amino acids according to the method of Bergmann, Ensslin and Zervas (Ber. dtsch. chem. Ges., vol. 58, 1925, page 1034), and reduction of the resulting Schiff's base; (c) by partial hydrogenolysis of the corresponding N,N-dibenzylated derivative obtained by reaction of benzylchloride with the free amino acid; (d) by saponification of an ester of an N-benzyl amino acid obtained by partial hydrogenolysis of the corresponding dibenzylated ester prepared by reacting benzyl chloride with the ester of an amino acid; (e) by hydrolysis of an N-acyl-N-benzyl amino acid; (f) by resolution of a racemic N-benzyl amino acid; and (g) by the action of a benzylamine upon an optically active α-halogenated acid.

(2) RACEMIC N-BENZYL AMINO ACIDS

In order to prepare the racemic N-benzyl amino acids, there may be employed all the processes listed hereinbefore for the production of the optically active compounds, of course, with the exception of the process disclosed under (f). Furthermore, one may react benzylamine, in the presence of an alkali cyanide, with the aldehyde-bisulfite compound of an aldehyde containing one carbon atom less than the desired N-benzylated amino acid. Thereby, the nitrile of the N-benzylated amino acid is obtained, which nitrile can be saponified to form N-benzyl amino acids.

Racemic or optically active N,N-dibenzyl amino acids are prepared by the action of benzylchloride upon the corresponding amino acid or its esters. When using an ester, subsequent saponification is required.

The following examples serve to illustrate the various stages of the process according to the present invention. In order to show the ease with which N-benzyl or N,N-dibenzyl-N'-peptides are converted into the corresponding N'-peptides, there are also given examples illustrating the hydrogenolysis step. It is, of course, evident that the acid chlorides employed can be prepared in any other manner than those disclosed in the examples or that the amino acids can be esterified by methods different from those described hereinafter. The carboxyl group of the amino acid can also be blocked and protected in any other form than the ester form without departing from the spirit of the present invention. This invention consists essentially in the reaction of hydrochlorides of acid chlorides of N-benzyl or N,N-dibenzyl amino acids, which heretofore were not known, with amino acids or their carboxyl derivatives.

The melting points given in the examples are points of instantaneous melting determined on the Maquenne block.

The following formulas illustrate the preparation of peptides according to the present invention without, however, being limited thereto:

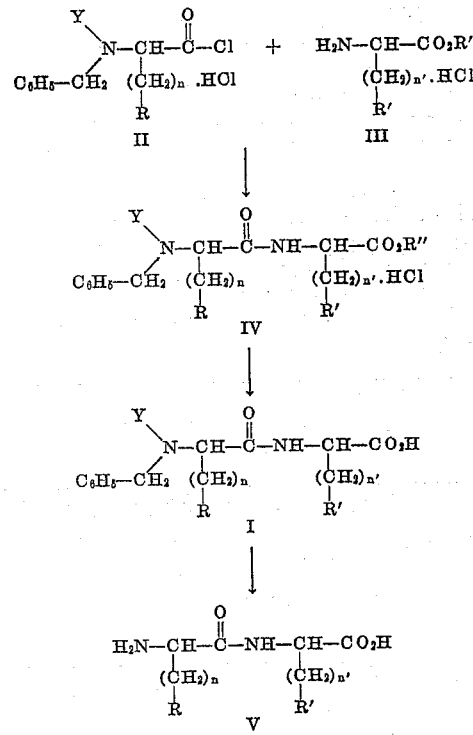

In these formulas:

Y indicates hydrogen or the benzyl radical,

R indicates hydrogen, an alkyl, aryl or heterocyclic radical, such as found in amino-acids which may also contain a hydroxyl group conveniently protected.

R' indicates hydrogen, an alkyl, aryl, or heterocyclic radical which is identical with or different from R and which may also contain a hydroxyl group, R'' indicates an alkyl radical or benzyl, $n$ is a numeral from 0 to 8, and $n'$ is a numeral from 0 to 8 which may be identical with or different from $n$.

*Example 1.—Preparation of N,N-dibenzyl glycyl-glycine*

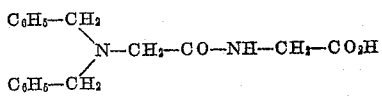

(a) PREPARATION OF THE HYDROCHLORIDE OF THE ACID CHLORIDE OF N,N-DIBENZYL GLYCYL

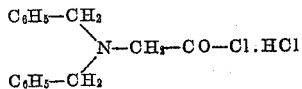

To produce this new compound, N,N-dibenzyl glycine of the formula

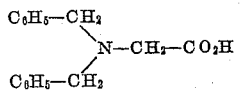

is used as starting material and is converted into the hydrochloride of the corresponding acid chloride by means of phosphorus pentachloride.

For this purpose 25 g. of potassium hydroxide in pellet form are dissolved in 75 cc. of water. 10 g. of glycine and 75 cc. of ethanol are added thereto. The mixture is heated to boiling and 33 cc. of benzylchloride corresponding to about 36 g. (theoretically required 34 g.) are added thereto within 10 minutes in such a manner that the mixture is kept boiling under reflux without external heating. Thereafter, the reaction mixture is boiled for 30 more minutes, about 30 to 40 cc. of the solvent are distilled off, and 10 cc. of acetic acid are slowly added thereto while boiling under reflux. After cooling, crystallization is initiated by rubbing, the precipitated crystals are filtered off by suction and are washed with water. The crude moist product is triturated by means of ether in order to remove excess of benzylchloride, filtered by suction, and dried. Trituration with ether to form a paste is repeated. In this manner 29 g. of N,N-dibenzyl glycine are obtained corresponding to a yield of 85%. To prepare therefrom the acid chloride, the product is recrystallized by dissolving it in the minimum amount of warm acetic acid and warm water is added to said solution until the mixture starts to become turbid. After cooling, filtering the precipitated crystals, and drying, pure N,N-dibenzyl glycine melting at 200° C. is obtained in a yield of 90%. Said compound is of white color, only slightly soluble in aqueous ethanol, very little soluble in ethanol, and insoluble in water.

The product yields a hydrochloride which is very slightly soluble in cold water so that it can be recrystallized from water. Thereby large prisms containing water of crystallization are obtained. They lose their water of crystallization at 200° C. on melting on the Maquenne block. The hydrochloride is soluble in methanol.

In order to convert N,N-dibenzyl glycine into the corresponding acid chloride, 40 g. thereof are suspended in 80 cc. of anhydrous benzene while stirring vigorously. The mixture is cooled to 0° C. by means of an ice-methanol mixture. 34 g. of pulverized phosphorus pentachloride (32.2 g. are theoretically required) are rapidly added to said cooled suspension in such a manner that within 2 minutes a temperature of about 35° C. is attained. Said temperatures should not be exceeded. Solution takes place and the hydrochloride of the acid chloride of N,N-dibenzyl glycine crystallizes soon thereafter. The mixture is cooled to 20° C. and stirred at said temperature. Thereafter it is cooled to 10° C., filtered, washed several times with benzene, and first rapidly dried at 50° C. and then over potassium hydroxide in a desiccator. 43 g. of the acid chloride are obtained corresponding to a yield of 89% of the theoretical yield. The resulting chloride is of white or slightly yellowish color and can directly be used for the reaction with an amino acid. It is stable and keeps well in ground stoppered bottles.

(b) CONDENSATION OF THE HYDROCHLORIDE OF THE ACID CHLORIDE OF N,N-DIBENZYL GLYCINE WITH THE HYDROCHLORIDE OF GLYCINE ETHYL ESTER

A mixture of 150.5 cc. of 2 N sodium hydroxide solution and 210 cc. of dioxane is prepared while stirring and cooling with ice. 42 g. of the hydrochloride of glycine ethyl ester are introduced at 0° C. into said mixture. The theoretically required amount is 38 g. calculated for two molecules of the glycine ester whereby one molecule serves to neutralize the hydrochloric acid formed during condensation. 25 g. of the hydrochloride of the acid chloride of N,N-dibenzyl glycine obtained as prescribed hereinbefore are added in portions, and while maintaining the temperature between 0° C. and 4° C., within ten minutes to said solution. The reaction mixture is of almost neutral reaction. Again 17 g. of said acid chloride are added while keeping the pH-value at 7.0–8.0 by the addition of 56 cc. (1 mol) of 2 N sodium hydroxide solution, said solution being added proportionately to the addition of the acid chloride. The total amount of acid chloride added is 42 g. Finally a milky solution of neutral reaction is obtained which is agitated for 15 more minutes. The greater part of the dioxane is removed by distillation in a vacuum in a water bath at 50° C. The residue of said distillation is extracted three times, each time with 200 cc. of chloroform. An insoluble product remains which is N,N-dibenzyl glycine. Said product is formed on hydrolysis of part of the acid chloride. By filtration, 5 g. thereof corresponding to 15% of the N,N-dibenzyl glycine employed in this reaction are recovered. The chloroform solution is agitated two times with 25 cc. of 5 N hydrochloric acid, dried over sodium sulfate, and evaporated to dryness in a vacuum. A slightly yellowish oil is obtained. 100 cc. of ether are added thereto while rubbing the mixture. The product is allowed to crystallize, filtered by suction, rinsed, and dried. The hydrochloride of the ethyl ester of N,N-dibenzyl glycyl glycine is obtained thereby in an amount of 34 g. The yield is 68%, i.e. 83% calculated after deducting the recovered dibenzyl glycine. The new compound is obtained in the form of colorless needles of the melting point: 160–161° C. It is soluble in water, alcohol, and chloroform and insoluble in ether and benzene.

In order to saponify the hydrochloride of the ethyl ester of dibenzyl glycyl glycine to form dibenzyl glycyl glycine, 40 g. thereof are dissolved in 72 cc. of 20% methanolic potassium hydroxide solution (60 cc. thereof are theoretically required). Immediately a precipitate of potassium chloride is formed. The mixture is boiled for 5 minutes under reflux and 144 cc. of water are added to the warm mixture. A clear lukewarm solution is obtained, which is at once acidified by the addition of 36 cc. of acetic acid. Under these conditions the solution remains clear and the reaction product crystallizes in well shaped crystals on cooling slowly. The mixture is then cooled with ice, filtered, washed with ice water, and dried. 30 g. of a product which melts at 138–140° C. are obtained. The yield amounts to 90%. The resulting dibenzyl glycyl glycine is soluble in aqueous alcohol and in acetic acid, insoluble in water, chloroform, and benzene.

*Analysis.*—Calculated for $C_{18}H_{20}O_3N_2$: 69.18% C; 6.45% H; 8.97% N. Found: 68.6% C; 6.4% H; 9.0% N.

*Example 2.—Preparation of glycyl glycine by hydrogenolysis of N,N-dibenzyl glycyl glycine*

$$H_2N-CH_2-CO-NH-CH_2-CO_2H$$

N,N-dibenzyl glycyl glycine prepared according to and described in Example 1 is subjected to hydrogenolysis. Palladium black, obtained by hydrogenation of 2 g. of vegetable charcoal, 5 cc. of a 2% palladium chloride solution, and 30 cc. of water is used as hydrogenation catalyst. After filtering off said catalyst from the hydrogenation solution, the catalyst is added to a warm solution of 10 g. of N,N-dibenzyl glycyl glycine in 100 cc. of acetic acid. The mixture is heated to about 80° C. and hydrogen is introduced thereinto. After about 20 minutes no more hydrogen is absorbed and hydrogenation stops as soon as the theoretical amount of hydrogen (1.400 liters) has been absorbed. The catalyst is filtered off while the mixture is still hot, washed with acetic acid, and the filtrate is evaporated to dryness in a vacuum. The residue is dissolved in a small amount of alcohol at 95%, the solution is cooled, crystallization is initiated by rubbing, and the crystalline precipitate is filtered off and dried. 4.1 g. of glycyl glycine are obtained corresponding to a yield of 98%. Said compound is recrystallized with a practically quantitative yield by dissolving the crude compound in warm water and adding alcohol thereto. The resulting glycyl glycine forms small colorless leaflets which decompose without properly melting at 210–215° C. Said compound is soluble in water and acetic acid and insoluble in alcohol.

*Analysis.*—Calculated for $C_4H_8O_3N_2$: 36.36% C; 6.10% H; 21.20% N. Found: 36.4% C; 6.0% H; 20.6% N.

*Example 3.—Preparation of glycyl glycine by hydrogenolysis of the benzyl ester of N,N-dibenzyl glycyl glycine*

$$H_2N-CH_2-CO-NH-CH_2-CO_2H$$

The benzyl ester of glycine is prepared according to the procedure disclosed by Miller and Waelsch in "Journ. Am. Chem. Soc.," vol. 74, page 1093 (1952). Said compound is allowed to react with the hydrochloride of the acid chloride of N,N-dibenzyl glycine obtained according to Example 1, whereby the procedure is the same as described in the preceding example. The hydrochloride of the benzyl ester of N,N-dibenzyl glycyl glycine is obtained thereby. Instead of saponifying said compound, it is directly subjected to hydrogenolysis and the resulting glycyl glycine is isolated after an amount of hydrogen sufficient to split off three benzyl groups has been absorbed.

*Example 4.—Preparation of N-benzyl-DL-alanylglycine*

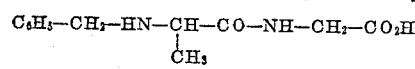

(a) PREPARATION OF THE HYDROCHLORIDE OF THE ACID CHLORIDE OF N-BENZYL-DL-ALANINE

In order to produce the above mentioned new compound, first N-benzyl-DL-alanine of the formula

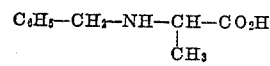

is prepared either by condensing benzaldehyde with the ethyl ester of alanine and hydrogenating and saponifying the resulting Schiff's base, or by reacting benzylamine with α-bromo propionic acid as will be described hereinafter. The resulting monobenzylated derivative of said amino acid is then converted into the hydrochloride of the corresponding acid chloride by the action of phosphorus pentachloride.

10 g. of α-bromo propionic acid are dissolved in 40 cc. of anhydrous ether. 25 g. of benzylamine are added to said solution thereby keeping the temperature at 30° C. by cooling. The reaction mixture is then allowed to stand at 30° C. for 4 hours. The resulting solution separates into two layers and solidifies to a solid mass. The precipitate is filtered off by suction, washed with cold absolute ethanol, and the crude product, representing a mixture of N-benzyl-DL-alanine and the hydrobromide of benzylamine and weighing about 15.5 g., is recrystallized from 150 cc. of ethanol at a concentration of 75%. As a first fraction there are obtained 8.5 g. corresponding to a yield of 72%.

The mother liquor therefrom is evaporated to dryness and is again dissolved in 75%, ethanol. From said solution a second fraction amounting to about 1 g. is obtained so that the total yield is 80%. The resulting N-benzyl-DL-alanine melts at about 250° C. without becoming clearly molten. It is obtained in the form of a mass of very fine colorless needles which are soluble in water and in warm aqueous solvents. It is very slightly soluble in ethanol, insoluble in ether, benzene, and chloroform.

To obtain therefrom the hydrochloride of the acid chloride, 5 g. of pulverized dry N-benzyl alanine are stirred with 10 cc. of benzene at room temperature. 5.75 g. of pulverized phosphorus pentachloride (the theoretical amount) are added to the resulting paste. Reaction sets in and the temperature increases to 50° C. Solution takes place in the yellow liquid and, soon thereafter, the hydrochloride of the acid chloride of N-benzyl-DL-alanine crystallizes. The mixture is agitated for 30 more minutes so as to complete crystallization, the crystals are filtered off on a fritted glass filter, and are washed several times by taking up the filter residue in benzene. The product is rapidly dried first at 60° in air and then in a desiccator over potassium hydroxide. 5 g. of the hydrochloride of the acid chloride of N-benzyl-DLalanine of the following formula are obtained, corresponding to a yield of 78%:

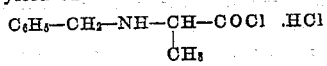

(b) CONDENSATION OF THE HYDROCHLORIDE OF THE ACID CHLORIDE OF N-BENZYL-DL-ALANINE WITH THE HYDROCHLORIDE OF THE ETHYL ESTER OF GLYCINE 4.8 g. of the hydrochloride of the ethyl ester of glycine are introduced at 0° C. into 16.8 cc. of 2 N sodium hydroxide solution cooled to 0° C. 32 cc. of dioxane are added to the resulting free ester base. 4 g. of the hydrochloride of the acid chloride of N-benzyl-DL-alanine are added to said solution in portions within 20 minutes while keeping the temperature between 0° C. and 5° C. A solution of substantially neutral reaction is obtained thereby. The dioxane is removed therefrom by evaporation in a vacuum. The remaining aqueous phase is several times extracted with chloroform. The chloroform solution is agitated two times with 5 cc. of 5 N hydrochloric acid, dried over sodium sulfate, the chloroform is distilled off, and the oily residue is dissolved in anhydrous ether. By rubbing, a pulverulent amorphous product is obtained which is dried. 3.1 g. corresponding to a yield of 60% are obtained in this manner.

3 g. of said crude ester are dissolved in 12 cc. of a 20% solution of potassium hydroxide in methanol. The mixture is boiled under reflux for 10 minutes. 20 cc. of water are added to dissolve the potassium chloride formed thereby. Methanol is removed by evaporation and the residual solution is acidified by means of acetic acid. The precipitate is filtered off and washed with a small amount of ice water. The crude product can be recrystallized from water. 1.6 g. of N-benzyl-DL-alanyl glycine, melting at 234–235° C., are obtained in the form of colorless needles which are soluble in acetic acid and aqueous solvents, slightly soluble in ethanol and water, and insoluble in chloroform, benzene, and ether. The yield is 70%.

*Example 5.—Preparation of DL-alanyl glycine by hydrogenolysis of N-benzyl-DL-alanyl glycine*

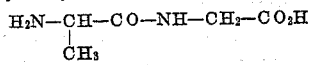

In order to effect hydrogenolysis to form DL-alanyl glycine, 1.5 g. of N-benzyl-DL-alanyl glycine obtained according to Example 4 are dissolved in 20 cc. of acetic acid at 80° C. 0.4 g. of palladium black are introduced into said solution. Said palladium black is obtained by hydrogenating 1.4 cc. of a 2% aqueous palladium chloride solution. At the end of 10 minutes, 120 cc. of hydrogen (140 cc. are theoretically required) are absorbed whereby heating is continued. The catalyst is filtered off, washed with glacial acetic acid, and the filtrate is evaporated to dryness. The residue is triturated in absolute ethanol, filtered by suction, and dried. 820 mg., corresponding to a yield of 90%, are obtained. Said product can be recrystallized from water and ethanol. The resulting DL-alanyl glycine is obtained in the form of colorless needles. It melts, without becoming clearly molten and with decomposition, at 257° C. It is soluble in water and acetic acid, insoluble in absolute ethanol, benzene, chloroform, and ether.

*Analysis.*—Calculated for $C_5H_{10}O_3N_2$: 41.08% C; 6.90% H; 19.17% N. Found: 41.0% C; 6.9% H; 19.3% N.

*Example 6.—Preparation of N-benzyl-DL-tryptophyl glycine*

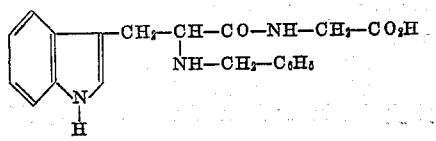

(a) PREPARATION OF THE HYDROCHLORIDE OF THE ACID CHLORIDE OF N-BENZYL-DL-TRYPTOPHANE

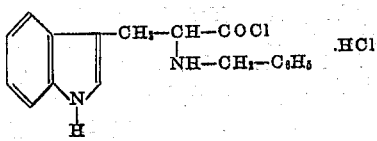

The above mentioned compound is prepared in the same manner as described for the acid chloride of Example 4(a) by starting with the monobenzylated derivative of the respective amino acid.

20 g. of the hydrochloride of the methyl ester of DL-tryptophane are partly dissolved in 40 cc. of water. 50 cc. of chloroform and 50 cc. of ether are added thereto and the mixture is cooled to minus 5° C. 10 cc. of ice cold sodium hydroxide solution are added thereto while stirring. The mixture is then salted out by the addition of potassium carbonate, the solvent is decanted, and the residue is again extracted two times with 40 cc. of chloroform each time. The solution is dried over sodium sulfate and is evaporated to dryness in a vacuum on a water bath at a temperature of 50° C. 17 g. of an oil representing the free ester are obtained. The yield is quantitative.

15 g. of said oily ester are dissolved in 30 cc. of benzene. 7.5 g. of benzaldehyde (corresponding to the theoretically required amount) are added thereto. The mixture is made lukewarm and reaction sets in. The mixture becomes turbid due to the water formed thereby. Part of the benzene is distilled off at atmospheric pressure so as to clarify the reaction mixture and to complete the reaction. Soon rapid solidification sets in. The mixture is cooled, filtered, and the filter residue is twice treated with ether so as to form a paste, and is filtered. 17.5 g. corresponding to a yield of 85% calculated for the hydrochloride of the methyl ester of DL-tryptophane are obtained in this manner. The resulting product is used as such for subsequent reduction. On recrystallization from ethyl acetate it melts at 132–133° C. 17 g. of said Schiff's base are dissolved in 170 cc. of warm methanol. The solution is cooled to 25° C. and 3.5 g. of a palladium catalyst precipitated on vegetable charcoal are added thereto. Said catalyst is obtained by hydrogenation of 17 cc. of a solution of 2% palladium chloride. Hydrogen is introduced into the methanolic solution of the Schiff's base. Within 40 minutes the theoretically required 1,300 cc. of hydrogen are absorbed and hydrogenation ceases. The mixture is filtered, the catalyst is washed with methanol, and the filtrate is evaporated to dryness in a vacuum. About 16 g. of an oil are obtained thereby, said oil corresponding to the methyl ester of N-benzyl-DL-tryptophane.

The oil is dissolved in 16 cc. of a 20% solution of potassium hydroxide in methanol and 5 cc. of water. The mixture is boiled under reflux for about 20 minutes. The methanol is partly removed therefrom by evaporation, and 25 cc. of water are added thereto. The resulting yellow solution is acidified by means of acetic acid. The precipitate is filtered, washed with water, and dried. In this manner, 14 g. of N-benzyl-DL-tryptophane are obtained. The yield is 72% calculated for the hydrochloride of the methyl ester of DL-tryptophane.

After recrystallization from aqueous acetic acid, the benzylated tryptophane melts at 250° C. It is obtained in the form of slightly yellowish needles which are only slightly soluble in aqueous solvents, very slightly soluble in water and ethanol, and insoluble in chloroform, benzene, and ether.

*Analysis.*—Calculated for $C_{18}H_{18}O_2N_2$: 73.44% C; 6.16% H; 9.52% N. Found: 73.4% C; 6.2% H; 9.5% N.

To convert said compound into the hydrochloride of the corresponding acid chloride, 10 g. thereof are suspended in a mixture of 40 cc. of chloroform and 60 cc. of benzene at room temperature (18–20° C.). 8 g. of pulverized phosphorus pentachloride (7 g. are theoretically required) are added thereto all at once. Partial dissolution takes place while the temperature increases to 30–35° C. within four minutes. On continuous agitation, the mixture becomes turbid and a rose-colored crystalline precipitate is formed in the brown solution. The mixture is kept for 30 minutes under agitation, cooled, filtered, the filter residue is washed several times with benzene, rapidly dried in air, and sifted in order to separate gummy globules. 8.8 g. of the crude hydrochloride of the corresponding acid chloride are obtained thereby. Said compound can immediately be employed for the condensation with an ester of an amino acid.

(b) CONDENSATION OF THE HYDROCHLORIDE OF THE ACID CHLORIDE OF N-BENZYL-DL-TRYPTOPHANE WITH THE HYDROCHLORIDE OF THE ETHYL ESTER OF GLYCINE

In order to cause reaction of the hydrochloride of the acid chloride of N-benzyl-DL-tryptophane with the ethyl ester of glycine, first 6 g. of the hydrochloride of said ester are added to 21 cc. of 2 N sodium hydroxide solution whereby the temperature is kept at minus 5° C. Thereafter 40 cc. of dioxane are added to the mixture in such a manner that the temperature within the reaction mixture is kept between 0° C. and 5° C. 5 g. of the hydrochloride of the acid chloride of N-benzyl-DL-tryptophane are then added to the mixture within 20 minutes while keeping the temperature between 0° C. and 5° C. during the entire duration of said addition and while stirring vigorously. As soon as the reaction is completed, a solution is obtained which separates into two phases. The dioxane phase, after salting out by the addition of mineral salts, is removed by decanting and the aqueous phase is extracted two times with 50 cc. of chloroform each time. The chloroform extracts are combined with the decanted dioxane, the combined solutions are dried over sodium sulfate and the solvents are evaporated in a vacuum. The residual brown oil is dissolved in 50 cc. of chloroform. Said chloroform solution is three times extracted, each time with two cc. of N hydrochloric acid, until the aqueous phase remains permanently acid. After the last extraction, the hydrochloride of the ethyl ester of N-benzyl-DL-tryptophyl glycine crystallizes. After crystallization is complete the crystals are filtered off by means of a fritted glass filter and are washed with ether. 3.5 g. of a crude product are obtained which can directly be saponified to N-benzyl-DL-tryptophyl glycine. The yield amounts to 60%.

To effect saponification, 3 g. of the hydrochloride of the ester are dissolved in 5 cc. of a 20% solution of potassium hydroxide in methanol. The mixture is boiled under reflux for three minutes. 10 cc. of water are added thereto and the mixture is acidified with acetic acid. The resulting precipitate is filtered off, washed with water, and dried. 2.3 g. of N-benzyl-DL-tryptophyl glycine are obtained thereby in a yield of 90%. Said compound can be recrystallized from aqueous acetic acid. It melts at 198–200° C. It is very slightly soluble in water and cold ethanol and insoluble in benzene, chloroform, and ether.

*Example 7.—Preparation of DL-tryptophyl glycine by hydrogenolysis of N-benzyl-DL-tryptophyl glycine*

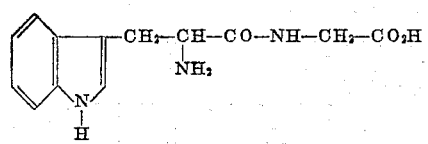

Hydrogenalysis of N-benzyl-DL-tryptophyl glycine to DL-tryptophyl glycine is effected as described in the preceding examples by means of palladium black in warm acetic acid at about 80° C. which temperature is maintained during hydrogenation by heating. 70 cc. of hydrogen as they are required for the hydrogenolysis of 1 g. of N-benzyl-DL-tryptophyl glycine are absorbed within ten minutes. The reaction mixture is filtered while still warm in order to remove the catalyst and is then allowed to crystallize. In this manner 0.6 g. of tryptophyl glycine are obtained as a first fraction after drying in a vacuum over potassium hydroxide. Concentration of the mother liquors yields a further amount of 70 mg. to 100 mg. of said compound. The total yield is between 90% and 95%. The product can be recrystallized from water and ethanol and is then obtained in very fine needles melting at 160–170° C., whereafter the molten mass solidifies and melts again at 268–270° C. DL-tryptophyl glycine is hygroscopic and, on storage, it becomes rosy in color. It is soluble in water, aqueous ethanol, and warm absolute ethanol, and insoluble in hydrophobic solvents.

*Example 8.—Preparation of N,N-dibenzyl diglycyl glycine by reaction of the hydrochloride of the acid chloride of N,N-dibenzyl glycine with the hydrochloride of the ethyl ester of glycyl glycine and saponification of the resulting ester*

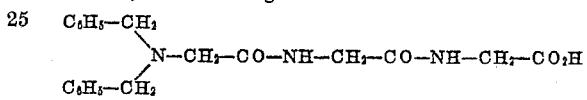

(a) PREPARATION OF THE HYDROCHLORIDE OF ETHYL ESTER OF GLYCYL GLYCINE

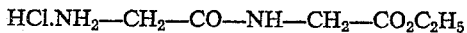

Said compound is obtained by esterification of glycyl glycine described in Examples 2 and 3 in the presence of hydrochloric acid. Starting with 2.2 g. of glycyl glycine, there are obtained 2.95 g. of the hydrochloride of the ethyl ester of glycyl glycine in a yield of 92%. Said ester forms colorless needles melting at 182–183° C. The ester is soluble in water and aqeous solvents and almost insoluble in cold ethanol.

(b) CONDENSATION OF THE HYDROCHLORIDE OF THE ACID CHLORIDE OF N,N-DIBENZYL GLYCINE WITH THE HYDROCHLORIDE OF THE ETHYL ESTER OF GLYCYL GLYCINE 10 cc. of dioxane and 6 cc. of pure N sodium hydroxide solution are added at a temperature between 0° C. and 5° C. to 1.3 g. (2 mols) of the hydrochloride of the ethyl ester of glycyl glycine. 0.5 g. of the hydrochloride of the acid chloride of N,N-dibenzyl glycine in pulverized form, as it is obtained according to Example 1, are added portion by portion to said mixture while keeping the temperature between 0° C. and 5° C. Thereafter 0.5 g. of the same hydrochloride are added and gradually 3.2 cc. of N sodium hydroxide solution in order to neutralize the hydrochloric acid split off from said hydrochloride.

The clear and neutral solution obtained thereby is distilled in a vacuum in order to remove most of the dioxane. The aqueous residue from which an oil separates is extracted twice each time with 10 cc. of chloroform. The chloroform solution is extracted with 4 cc. of 5 N hydrochloric acid, dried over sodium sulfate and evaporated to dryness. Anhydrous ether is added to the resulting oil which yields, by rubbing a very hygroscopic, pulverulent, amorphous product that is rapidly filtered and dried in a desiccator. 1 g., corresponding to a yield of 70%, is obtained thereby. The resulting hydrochloride of the ethyl ester of N,N-dibenzyl diglycyl glycine is dissolved in 1.5 cc. of a 20% solution of potassium hydroxide in methanol. The mixture is heated under reflux for 5 minutes, 6 cc. of water are added thereto, the resulting mixture is acidified with acetic acid, and is extracted with chloroform. The dried solution, after evaporation to dryness, yields 0.8 g. of N,N-dibenzyl diglycyl glycine in the form of an oil. The yield is 94%.

*Example 9.—Preparation of N-benzyl diglycyl glycine*

$$C_6H_5-CH_2-HN-CH_2-CO-NH-CH_2-CO-NH-CH_2-CO_2H$$

Said compound can either be prepared by partial hydrogenolysis of its dibenzylated derivative or by reacting the hydrochloride of the acid chloride of N-benzyl glycine with the hydrochloride of the ethyl ester of glycyl glycine described in Example 8.

(a) PREPARATION OF THE HYDROCHLORIDE OF THE ACID CHLORIDE OF N-BENZYL GLYCINE $$C_6H_5-CH_2-NH-CH_2-COCl.HCl$$

First N-benzyl glycine of the formula $$C_6H_5-CH_2-NH-CH_2-CO_2H$$

is prepared by partial hydrogenolysis of N,N-dibenzyl glycine obtained according to Example 1. Palladium black required in this reduction reaction is prepared by reduction of 20 cc. of a 2% solution of palladium chloride in the presence of 100 cc. of water and of 2 g. of vegetable charcoal. The reduced catalyst mixture is filtered and is washed with distilled water and thereafter with methanol. The resulting catalyst is introduced into a solution of 10 g. of N,N-dibenzyl glycine and 100 cc. of methanol containing 5 cc. of concentrated hydrochloric acid. The mixture is hydrogenated. At the end of 15 minutes, about 800 cc. of hydrogen (870 cc. of hydrogen are theoretically required) are absorbed and hydrogenation ceases spontaneously. The catalyst is separated by filtration, washed with methanol and the combined filtrate and methanol wash water are concentrated by evaporation until crystallization sets in. Thereafter, ether is added. The mixture solidifies to a mass of large mother of pearl-like colorless leaflets of the hydrochloride of N-benzyl glycine which is filtered off and dried. 6 g. thereof are obtained. On evaporation of the mother liquors to dryness and dissolving the residue in ether, further 1.2 g. of said compound are obtained which can be recrystallized from acetic acid. The total yield is 7.2 g. corresponding to a yield of 92% of the theoretical yield. The compound is obtained in the form of colorless leaflets melting at 208-209° C. It is soluble in water and in ethanol.

N-benzyl glycine in the free state is obtained by displacement of the hydrochloride in alcoholic solution by sodium acetate or aniline. The resulting N-benzyl glycine is recrystallized from alcohol at 75%. It melts at 198-200° C., is soluble in water, slightly soluble in aqueous ethanol, and insoluble in chloroform and benzene.

*Analysis.*—Calculated for $C_9H_{11}O_2N$: 65.43% C; 6.71% H; 8.48% O; 19.38% N. Found 65.0% C; 6.5% H; 8.6% O; 19.7% N.

5.5 g. of phosphorus pentachloride are added to a suspension 5 g. of pulverized, sifted, and dried hydrochloride of N-benzyl glycine obtained as set forth hereinbefore, in 20 cc. of phosphorus oxychloride while stirring and at a temperature of 20° C. The temperature increases to 35° C. The hydrochloride of the acid chloride of N-benzyl glycine rapidly crystallizes before the starting material is completely dissolved. Stirring is continued for one hour. The mixture is filtered and washed first with a small amount of phosphorus oxychloride and then with cyclohexane. After drying, the hydrochloride of the acid chloride of N-benzyl glycine is obtained in the form of fine colorless needles in an amount of 3.9 g. corresponding to a yield of 70%.

(b) CONDENSATION OF THE HYDROCHLORIDE OF THE ACID CHLORIDE OF N-BENZYL GLYCINE WITH THE HYDROCHLORIDE OF THE ETHYL ESTER OF GLYCYL GLYCINE

The condensation is carried out in the same manner and under the same reaction conditions as described in Example 8 and the ethyl ester of the monobenzylated peptide is saponified according to the mode of operation described for the corresponding dibenzylated derivative. Thereby N-benzyl diglycyl glycine melting at 232-233° C. is obtained. This compound is soluble in water and acetic acid and insoluble in absolute ethanol and other solvents.

*Example 10.—Preparation of diglycyl glycine by hydrogenolysis of the corresponding N,N-dibenzylated or the N-monobenzylated derivatives*

$$H_2N-CH_2-CO-NH-CH_2-CO-NH-CH_2-CO_2H$$

This compound can be obtained by hydrogenolysis of the di-benzylated tripeptide described in Example 8 or by hydrogenolysis of the monobenzylated tripeptide described in Example 9.

1.35 g. of the dibenzylated derivative obtained according to Example 8 are subjected to hydrogenolysis by means of palladium black in acetic acid while heating as indicated in the preceding examples. Hydrogenolysis may either be interrupted after about 20 minutes as soon as the theoretical amount of hydrogen (70 cc.) has been absorbed whereafter the monobenzylated derivative described in Example 5 is isolated. Hydrogenolysis may also be continued until diglycyl glycine is formed. In the first case, after filtration of the catalyst and distillation of the solvent, dissolution of the residue in water and addition of alcohol thereto, 780 mg. of N-benzyl diglycyl glycine melting at 232-233° C. are isolated. The yield is 78%.

When continuing hydrogenolysis until an amount of hydrogen has been absorbed as required for the elimination of two benzyl radicals, diglycyl glycine is obtained in a yield of 90% calculated for the monobenzylated derivative. Said product melts at 232-33° C. It forms small colorless leaflets which are soluble in water and acetic acid. By reacting said compound with 3,5-dinitro benzoylchloride in the presence of sodium hydroxide, the dinitro benzoate melting at 235-236° C. is obtained.

*Example 11.—Preparation of diglycyl glycine by reacting the acid chloride of N,N-dibenzyl glycyl glycine with the ethyl ester of glycine*

$$H_2N-CH_2-CO-NH-CH_2-CO-NH-CH_2-CO_2H$$

First, N,N-dibenzyl glycyl glycine is prepared according to the method described in Example 1. Said compound is then converted into the hydrochloride of the corresponding acid chloride by the action of phosphorus pentachloride as indicated in the preceding examples. 4 g. of phosphorus pentachloride are added to the suspension of 4 g. of N,N-dibenzyl glycyl glycine in 8 cc. (2 parts by volume) of anhydrous benzene while stirring vigorously and in such a manner that the temperature is increased to 40° C. Rapid dissolution takes place, whereafter the mixture solidifies. The solidified product is filtered after stirring the mixture for 30 minutes and is washed several times with benzene. It is rapidly dried in air. 4 g. of the acid chloride are obtained corresponding to a yield of 94%.

1.5 g. (2 mols) of the hydrochloride of the ethyl ester of glycine are dissolved in a mixture of 10 cc. of N sodium hydroxide solution and 20 cc. of dioxane while keeping the temperature between 0° C. and 5° C. 2 g. (one mol) of the hydrochloride of the acid chloride of N,N-dibenzyl glycyl glycine are added in portions to said solution while keeping the temperature between 0° C. and 5° C. and maintaining the reaction at the end of the addition of said acid chloride slightly alkaline by adding 5 cc. of N sodium hydroxide solution. Said sodium hydroxide solution causes neutralization of the hydrochloric acid of said hydrochloride. Dioxane is removed by distillation in a vacuum, the residue is twice extracted with chloroform, each time with 15 cc. The chloroform solution is extracted twice with 3 cc. of 5 N hydrochloric acid, dried, and evaporated to dryness. The oily residue is triturated in anhydrous ether and yields the hydrochloride of the amorphous ester described in Example 8 in pulverulent and hygroscopic form. Saponification of said ester and hydrogenolysis are carried out as described in Examples 8 and 10.

*Example 12.—Preparation of the benzyl ester of N-benzyl-L-leucyl L-leucine and hydrogenolysis of said ester to L-leucyl L-leucine*

(Formula V, wherein $n$ and $n'=1$; R and R'$=(CH_3)_2.CH$)

Said compound is obtained by reacting the hydrochloride of the acid chloride of N-benzyl-L-leucine with the benzyl ester of L-leucine.

(*a*) PREPARATION OF N-BENZYL-L-LEUCINE BY STARTING WITH THE HYDROCHLORIDE OF THE METHYL ESTER OF L-LEUCINE

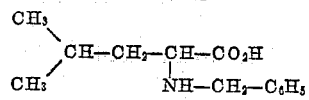

6 g. of L-leucine are dissolved in the cold in 50 cc. of absolute methanol containing 10% of dry hydrochloric acid. The mixture is heated under reflux for one hour. Thereafter, the solution is evaporated to dryness in a vacuum. The residue is dissolved in a few cc. of absolute ethanol while heating and the solution is diluted with anhydrous ether. On cooling, the hydrochloride of the methyl ester of L-leucine crystallizes in long colorless needles. The mixture is cooled with ice, filtered, washed with ether, and dried in a desiccator over potassium hydroxide.

8.1 g. of the hydrochloride of the ester obtained thereby are suspended in 100 cc. of ether. The mixture is cooled for half an hour in a bath containing a mixture of ice and methanol whereafter 24.5 cc. of 2 N sodium hydroxide solution, also cooled to 0° C., are added. The mixture is vigorously stirred for several minutes, the liquid is decanted, and the residue is twice extracted, each time with 25 cc. of ether. Before the last extraction, the aqueous phase is saturated with sodium sulfate. These operations must be carried out quite rapidly and at a low temperature in order to avoid saponification of the L-leucine ester.

The combined ether extracts are then dried over anhydrous sodium sulfate and are evaporated to dryness in a vacuum whereby the temperature of the water bath should not exceed 30–35° C. The free ester is obtained in the form of a rather fluid oil weighing 6.5 g. The yield is quantitative.

Said oil is condensed with benzaldehyde by adding thereto 4.7 cc. of benzaldehyde (the theoretical amount). After several seconds the solution starts to become turbid and the temperature increases noticeably. Anhydrous sodium sulfate is added in small portions in order to bind the water formed in the course of the reaction, until the solution again becomes clear. The mixture is then allowed to stand for 1 hour while it is heated from time to time to 30–35° C. in order to complete the reaction.

The sodium sulfate is extracted with anhydrous ether and the solution is evaporated in a vacuum by heating on a water bath. The Schiff's base formed during said reaction, i.e. the methyl ester of benzylidene L-leucine, is obtained in the form of a rather fluid oil, weighing 9.3 g. The yield amounts to 90%. For the hydrogenation step, a palladium catalyst is used as it is prepared according to the preceding examples from 10 cc. of a 2% palladium chloride solution. As hydrogenation solvent, there are used 100 cc. of absolute methanol. Hydrogenation is carried out at ordinary temperature. 925 cc. of hydrogen (the theoretically required amount is 895 cc.) are absorbed within 20 minutes. The catalyst is filtered off and washed with methanol. The filtrate and the wash methanol are concentrated by evaporation to a volume of about 30 cc. The residue is directly saponified to N-benzyl-L-leucine by the addition of 12 cc. of a 20% potassium hydroxide solution in methanol (excess of 10% over the theoretically required amount) and heating the mixture at 35–400° C. for half an hour. The resulting red solution is acidified with acetic acid. N-benzyl-L-leucine precipitates and solidifies. It is diluted with a small amount of ether, filtered by suction, washed, and dried on air.

Said N-benzyl-L-leucine is purified by recrystallization from 65 cc. of 40% acetic acid. The boiling solution is decolorized by means of charcoal. On cooling, the benzyl derivative crystallizes. The mixture is cooled with ice. The crystals are filtered off, washed with water, and dried. The yield amounts to 48% calculated on the ester of N-benzylidene-L-leucine. The compound does not have a definite melting point. It melts at 225° C. thereby partly subliming and, at the same time, partly decomposing.

(*b*) PREPARATION OF THE HYDROCHLORIDE OF THE ACID CHLORIDE OF N-BENZYL-L-LEUCINE

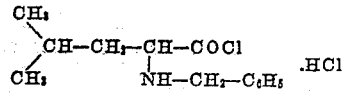

2 g. of the above described N-benzyl N-leucine are suspended in 6 cc. of anhydrous benzene. 2 g. of pulverized phosphorus pentachloride are added thereto in small portions while stirring well. The amount of phosphorus pentachloride added exceeds the theoretically required amount by 5%. Reaction sets in and the temperature increases to 40–45° C. In the course of the reaction, N-benzyl-L-leucine goes into solution.

After all the phosphorus pentachloride has been added, which requires about 5–10 minutes, stirring of the mixture is continued and the solution is cooled with ice. The hydrochloride of the acid chloride crystallizes in colorless needles. It is filtered, washed with benzene, and dried in a desiccator. By diluting the benzene mother liquors and wash waters with a small amount of petroleum ether (boiling point: 60–80° C.), a second portion of said acid chloride is obtained. The total yield of the hydrochloride of the acid chloride of N-benzyl-L-leucine amounts to 70%.

(*c*) PREPARATION OF THE HYDROCHLORIDE OF THE BENZYL ESTER OF L-LEUCINE

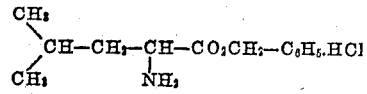

Said compound is prepared according to the procedure described by Miller and Waelsch in Journ. Am. Chem. Soc., vol. 74, page 1092 (1952), by esterifying L-leucine with benzyl alcohol in the presence of benzene sulfonic acid and by setting free the ester from its benzene sulfonate by means of triethylamine. The free ester is dissolved in ether and is treated with gaseous hydrochloric acid. The solvent and the excess of hydrochloric acid are driven off. Thereby the crude hydrochloride of said ester is obtained. This compound is pure enough for condensation with the hydrochloride of the acid chloride of N-benzyl L-leucine.

(*d*) CONDENSATION OF THE HYDROCHLORIDE OF THE ACID CHLORIDE OF N-BENZYL-L-LEUCINE WITH THE HYDROCHLORIDE OF THE BENZYL ESTER OF L-LEUCINE AND SUBSEQUENT HYDROGENOLYSIS

The procedure is the same as described in Examples 1 and 2. The resulting hydrochloride of the benzyl ester of the N-benzyl peptide is dissolved in chloroform. An aqueous solution of sodium bicarbonate is added thereto. The mixture is agitated and the sodium chloride solution is separated by means of a separatory funnel from the suspension of the free ester in chloroform. Said suspension is placed into a distillation flask and is evaporated to dryness in a vacuum. The remaining residue represents the benzyl ester of N-benzyl-L-leucyl L-leucine. Said ester is converted into L-leucyl L-leucine by hydrogenolysis in warm acetic acid. The procedure is the same as described heretofore for the hydrogenolysis of other esters. The resulting dipeptide of recrystallized from ethanol. The pure L-leucyl L-leucine has a melting point of 267° C. Its optical rotatory power [α]$_D^{20}$ is —13° (concentration=4% in N sodium hydroxide solution).

*Example 13.—Preparation of the hydrochloride of the ethyl ester of N'-(N,N-dibenzyl-glycyl)-DL-serine*

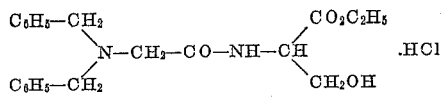

(a) PREPARATION OF THE HYDROCHLORIDE OF THE ACID CHLORIDE OF N,N-DIBENZYL GLYCINE

Said compound is prepared as disclosed in Example 1.

(b) PREPARATION OF THE HYDROCHLORIDE OF THE ETHYL ESTER OF DL-SERINE

The ethyl ester of DL-serine is obtained by reacting DL-serine with ethanol, as disclosed in the literature. The hydrochloride of said ester is obtained by carrying out said esterification in the presence of gaseous hydrochloric acid and evaporation of the excess of ethanol in a vacuum. The yield, on recrystallization from ether, amounts to 90%.

(c) CONDENSATION OF THE HYDROCHLORIDE OF THE ACID CHLORIDE OF N,N-DIBENZYL GLYCINE WITH THE ETHYL ESTER OF SERINE

The present example describes first the reaction and condensation of one mol of the hydrochloride of the acid chloride of N,N-dibenzyl glycine with 2 mols of the ethyl ester of serine. Thereby the second molecule of said ester serves as neutralizing agent for neutralizing the hydrochloric acid set free in the course of the reaction.

30 cc. of 2 N sodium hydroxide solution are added to 10 g. of the hydrochloride of the ethyl ester of DL-serine while keeping the temperature at 0° C. 60 cc. of dioxane are added to the mixture while cooling by means of ice. Thereupon there are introduced into the solution, which is kept at a temperature between 0° C. and 5° C., alternately and in portions, the hydrochloride of the acid chloride of N,N-dibenzyl glycine and 2 N sodium hydroxide solution in such a manner that the pH of the reaction mixture is kept in the neighborhood of 8.0, i.e. that the color of the solution, to which bromo thymol blue as indicator has been added, remains blue and does not turn red.

All in all, 10 g. of the hydrochloride of the acid chloride of N,N-dibenzyl glycine and 45 cc. of 2 N sodium hydroxide solution are added. The reaction mixture is stirred for 10 minutes. Thereafter, the dioxane is removed by evaporation in a vacuum on a water bath at 50° C. After cooling, an oil separates. The mixture is stirred with 50 cc. of chloroform and the insoluble N,N-dibenzyl glycine, formed in small quantities, is filtered off. After decanting the chloroform extract, the aqueous solution is again extracted with 50 cc. of chloroform and a third time with 25 cc. of chloroform. The combined chloroform extracts are agitated twice with 5 N hydrochloric acid, each time with 10 cc. of said acid. Thereby the reaction product is converted into the hydrochloride of the ester of the dibenzyl peptide. Said ester is soluble in chloroform. The other reaction products present in the reaction mixture pass into the aqueous hydrochloric acid phase.

The chloroform solution is dried over magnesium sulfate and is concentrated in a vacuum yielding an oil. It is converted by trituration with ether into a crystalline mass. The crystals are filtered and washed with a small amount of ether. After drying, 6.5 g. of the desired reaction product are obtained. Said product can be recrystallized with a yield of 90% by dissolving it in 1.5–2.0 parts by volume of warm ethanol and adding to said solution 4.0–6.0 parts by volume of ether. The resulting hydrochloride of the ethyl ester of the dibenzyl peptide is obtained in the form of colorless prisms melting at about 160° C.

*Analysis.*—Calculated for $C_{21}H_{27}O_4N_2Cl$: 62.0% C.; 6.7% H; 6.9% N; 8.7% Cl. Found: 62.3% C; 6.9% H; 6.9% N; 9.3% Cl.

Said compound may also be prepared by using only one mol of the ethyl ester of DL-serine. The procedure is about the same as described above except that only 19 g. of the hydrochloride of the acid chloride of N,N-dibenzyl glycine are added and the amount of sodium hydroxide solution required is 55 cc. 12 g. of the hydrochloride of the ethyl ester of N,N-dibenzyl glycyl-DL-serine are obtained corresponding to a yield of 50% calculated for the hydrochloride of the acid chloride of N,N-dibenzyl glycine.

*Example 14.—Preparation of the hydrochloride of N'-(N,N-dibenzyl glycyl)-DL-serine*

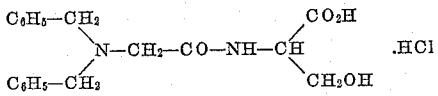

The ethyl ester of said compound as described in Example 13(c) is used as starting material in this process.

2 g. of the hydrochloride of the ethyl ester of N'-(N,N-dibenzyl glycyl)-DL-serine are boiled under reflux for 10 minutes with 4 cc. of a 10% potassium hydroxide solution in ethanol. 10 cc. of water are added to the reaction mixture and the methanol is driven off. The clear solution is acidified with 2 cc. of acetic acid. The precipitated oil is extracted three times with chloroform, each time with 5 cc. of chloroform. The combined chloroform extracts are dried over magnesium sulfate and yield, on evaporation to dryness in a vacuum, an oil which is dissolved in 5 cc. of warm N hydrochloric acid solution. By slowly cooling the solution in hydrochloric acid, the hydrochloride of N'-(N,N-dibenzyl glycyl)-DL-serine precipitates in large leaflets. The crystals are filtered, washed with a small amount of N hydrochloric acid, and dried at 80° C. in a ventilated drying oven. 1.35 g. of a first fraction are obtained. Further amounts of said compound can be recovered from the hydrochloric acid containing mother liquors by salting out with sodium chloride or by concentration by evaporation. The resulting compound has an unsharp melting point at 165° C. (with decomposition).

*Analysis.*—Calculated for $C_{19}H_{23}O_4N_2Cl$: 60.2% C; 6.1% H; 7.4% N; 9.3% Cl. Found: 60.1% C; 6.3% H; 7.2% N; 10.2% Cl.

*Example 15.—Preparation of N-glycyl-DL-serine by hydrogenolysis of the hydrochloride of N'-(N,N-dibenzyl glycyl)-DL-serine*

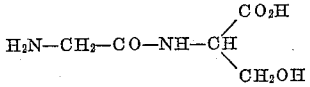

Hydrogenolysis of the crude dibenzyl compound obtained according to Example 14 in the presence of palladium black yields quantitatively N-glycyl-DL-serine. Said compound melts at 238–240° C. with decomposition.

*Analysis.*—Calculated for $C_5H_{10}O_4N_2$: 37.03% C; 6.22% H; 39.47% O; 17.28% N. Found: 37.3% C; 6.4% H; 39.5% O; 17.4% N.

The hydrochloride of said N-glycyl-DL-serine is obtained by dissolving N-glycyl-DL-serine in a small amount of N-hydrochloric acid and precipitating the solution by the addition of acetone. Said hydrochloride melts quite unsharp at about 160° C. and forms colorless needles.

*Example 16.—Preparation of N-benzyl-DL-serine*

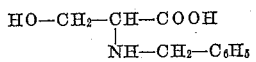

5 g. of the hydrochloride of the ethyl ester of DL-serine, obtained as described in Example 13(b), are added to 3 cc. of 10 N sodium hydroxide solution at 0° C. in the presence of 20 cc. of chloroform. The reaction mixture is allowed to separate into a chloroform layer and an aqueous layer. The chloroform layer is separated therefrom, and the aqueous layer is again extracted with chloroform. The combined chloroform extracts are dried over anhydrous sodium sulfate solution and are then filtered. The chloroform is distilled off. The resulting residue in the amount of 2.8 g. is an oil which represents the free ester of DL-serine.

1.8 g. of benzaldehyde are added to 2 g. of said ester. The reaction mixture, after a few minutes, starts to become warm and turbid. A small amount of anhydrous magnesium sulfate is added thereto in order to absorb the water formed thereby. In this manner the solution is clarified and is then heated at 50° C. for one hour. After cooling, the mixture is dissolved in ether, filtered in order to remove the magnesium sulfate, and the ether is evaporated. 3 g. of an oil are obtained. Said oil represents the ethyl ester of N-benzylidene-DL-serine.

Said compound is dissolved in 30 cc. of methanol and the solution is hydrogenated in the presence of 1 g. of charcoal containing 4% of palladium. Within 15 minutes, one mol of hydrogen is absorbed. The reaction mixture is filtered in order to remove the catalyst. 10 cc. of a 10% potassium hydroxide solution in methanol are added thereto and the mixture is heated to boiling under reflux for 10 minutes. Thereafter, the solution is concentrated by evaporation and acidified with acetic acid. 2 g. of N-benzyl-DL-serine precipitate in the form of crystals. The yield is 68% calculated for the ester used as starting material. On recrystallization from methanol, a compound is obtained which melts at 235–236° C. in capillary tube. The resulting N-benzyl-DL-serine is slightly soluble in water and alcohols and insoluble in ether.

*Analysis.*—Calculated for $C_{10}H_{13}O_3N$: 61.52% C; 6.71% H; 7.17% N; 24.59% O. Found: 61.5% C; 6.7% H; 7.2% N; 24.5% O.

The new process as claimed hereinafter represents a remarkable improvement over the prior art processes of making di- and polypeptides and, therefore, will be of great value in the ultimate synthesis of protein-like compounds. The new compounds obtained thereby represent valuable intermediates in the synthesis of such protein-like compounds and may be used as such or after splitting off the benzyl residues for nutritional purposes, for instance, in place of protein hydrolysates. They permit the administration of very definite and specific peptides to overcome certain amino acid deficiencies and are of considerable advantage over such protein hydrolysates because they allow proper and precise dosage. The peptides can, of course, also be used for technical purposes in place of protein hydrolysates and the like.

We claim:

1. In a process of producing polypeptide compounds, the steps comprising adding, portion by portion, the hydrochloride of an acid chloride of an N-benzylated amino acid to a solution, in dioxane, of an amino compound selected from the group consisting of an amino acid and a peptide, the carboxyl group of said amino compound being converted into an ester group, keeping the temperature during addition of said N-benzylated compound at a temperature between about 0° C. and about 5° C. and the pH value of the mixture at a pH between about 7.0 and about 8.0 by the addition of alkali hydroxide solution, removing the dioxane by distillation in a vacuum, extracting the reaction mixture by means of chloroform, agitating the resulting chloroform solution with hydrochloric acid, evaporating the acid-treated chloroform solution to dryness, and saponifying the hydrochloride of the ester of the resulting N-benzylated peptide by boiling under reflux its solution in methanolic alkali hydroxide solution.

2. The process according to claim 1, wherein the amino compound is an amino compound the carboxyl group of which is converted by esterification, into the benzyl ester group.

3. In a process of producing N-benzyl-DL-tryptophyl glycine, the steps comprising adding, portion by portion, the hydrochloride of the acid chloride of N-benzyl-DL-tryptophane to a solution of the ethyl ester of glycine in dioxane, keeping the temperature during addition of said N-benzylated compound at a temperature between about 0° C. and about 5° C. and the pH-value of the mixture at a pH between about 7.0 and about 8.0 by the addition of alkali hydroxide solution, adding salt to the mixture to cause separation into a dioxane layer and an aqueous layer, removing the dioxane layer, extracting the aqueous layer with chloroform, combining the chloroform extract with the dioxane layer, evaporating the solvents in a vacuum, dissolving the residual oil in chloroform, agitating the chloroform solution with hydrochloric acid, crystallizing the resulting hydrochloride of the ethyl ester of N-benzyl-DL-tryptophyl glycine, and saponifying said hydrochloride by boiling under reflux its solution in methanolic alkali hydroxide solution.

4. In a process of producing N,N-dibenzyl diglycyl glycine, the steps comprising adding, portion by portion, the hydrochloride of the acid chloride of N,N-dibenzyl glycine to a solution of glycyl glycine ethyl ester in dioxane, keeping the temperature during addition of said N-benzylated compound at a temperature between about 0° C. and about 5° C. and the pH-value of the mixture at a pH between about 7.0 and about 8.0 by the addition of alkali hydroxide solution, removing the dioxane by distillation in a vacuum, extracting the reaction mixture by means of chloroform, agitating the resulting chloroform solution with hydrochloric acid, evaporating the acid-treated chloroform solution to dryness, and saponifying the resulting hydrochloride of the ethyl ester of N,N-dibenzyl glycyl glycine by boiling under reflux its solution in methanolic alkali hydroxide solution.

5. In a process of producing N,N-dibenzyl diglycyl glycine, the steps comprising adding, portion by portion, the hydrochloride of the acid chloride of N,N-dibenzyl glycine to a solution of the ethyl ester of glycine in dioxane, keeping the temperature during the addition of said N-benzylated compound at a temperature between about 0° C. and about 5° C. and the pH-value of the mixture at a pH between about 7.0 and about 8.0 by the addition of alkali hydroxide solution, removing the dioxane by distillation in a vacuum, extracting the reaction mixture by means of chloroform, agitating the resulting chloroform solution with hydrochloric acid, evaporating the acid-treated chloroform solution to dryness, and saponifying the resulting hydrochloride of the ethyl ester of N,N-dibenzyl diglycyl glycine by boiling under reflux its solution in methanolic alkali hydroxide solution.

6. In a process of producing N,N-dibenzyl-N'-glycyl serine, the steps comprising adding, portion by portion, the hydrochloride of the acid chloride of N,N-dibenzyl glycine to a solution of the ethyl ester of DL-serine in dioxane, keeping the temperature during adding of said N-benzylated compound at a temperature between about 0° C. and about 5° C. and the pH-value of the mixture at a pH between about 7.0 and about 8.0 by the addition of alkali hydroxide solution, removing the dioxane by distillation in a vacuum, extracting the reaction mixture by means of chloroform, agitating the resulting chloroform solution with hydrochloric acid, evaporating the acid-treated chloroform solution to dryness, and saponifying the resulting hydrochloride of the ethyl ester of the N-benzylated peptide by boiling under reflux its solution in methanolic alkali hydroxide solution.

7. In a process of producing an N,N-dibenzyl-N'-peptide, the steps comprising adding, portion by portion, the hydrochloride of the acid chloride of an N,N-dibenzylated amino acid to a solution of an ester of a hydroxy amino acid in dioxane, keeping the temperature during the addition of said N-benzylated compound at a temperature between about 0° C. and about 8° C. and the pH-value of the mixture at a pH between about 7.0 and about 8.0 by the addition of alkali hydroxide solution, removing the dioxane by distillation in a vacuum, extracting the reaction mixture by means of chloroform, agitating the resulting chloroform solution with hydrochloric acid, evaporating the acid-treated chloroform solution to dryness, and saponifying the resulting hydrochloride of the ester of the N,N-dibenzyl-N'-peptide of said amino acid and said hydroxy amino acid by boiling under reflux its solution in methanolic alkali hydroxide solution.

References Cited in the file of this patent

Hartung et al.: Organic Reactions, vol. 7, pp. 264, 265, 273, and 275 (1953), John Wiley and Sons, Inc., New York.

Anson et al.: Advances in Protein Chemistry, vol. 5, pp. 11, 38, 52 and 53 (1949), New York.

Nickerson et al.: Chemical Abstracts, vol. 44, pp. 1195–1196 (1950).

Fischer: Untersuchungen für aminosauen, Polypeptide and Proteine II, p. 878 (1923), Berlin.